(12) United States Patent
Chattopadhyay et al.

(10) Patent No.: US 10,659,561 B2
(45) Date of Patent: May 19, 2020

(54) SERVICE STATE PRESERVATION ACROSS NODES

(71) Applicant: Microsoft Technology Licensing, LLC, Redmond, WA (US)

(72) Inventors: Romit Chattopadhyay, Redmond, WA (US); Peter Alfred Zabback, Kirkland, WA (US); Mariyan D. Fransazov, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 210 days.

(21) Appl. No.: 15/619,349

(22) Filed: Jun. 9, 2017

(65) Prior Publication Data
US 2018/0359336 A1 Dec. 13, 2018

(51) Int. Cl.
| | |
|---|---|
| *H04L 29/08* | (2006.01) |
| *G06F 9/50* | (2006.01) |
| *G06F 11/20* | (2006.01) |
| *G06F 9/30* | (2018.01) |

(52) U.S. Cl.
CPC .......... *H04L 67/32* (2013.01); *G06F 9/5005* (2013.01); *G06F 11/2041* (2013.01); *G06F 11/2058* (2013.01); *G06F 11/2064* (2013.01); *G06F 11/2066* (2013.01); *G06F 11/2097* (2013.01); *G06F 9/30* (2013.01); *H04L 67/10* (2013.01)

(58) Field of Classification Search
CPC ................................ H04L 67/10; H04L 67/32
See application file for complete search history.

(56) References Cited

U.S. PATENT DOCUMENTS

| | | | |
|---|---|---|---|
| 5,764,897 A | * 6/1998 | Khalidi | G06F 9/465 707/999.01 |
| 6,622,261 B1 | 9/2003 | Laranjeira et al. | |

(Continued)

FOREIGN PATENT DOCUMENTS

WO      2016063114 A      4/2016

OTHER PUBLICATIONS

Singh, et al., "High Availability of Clouds: Failover Strategies for Cloud Computing Using Integrated Checkpointing Algorithms", In Proceedings of International Conference on Communication Systems and Network Technologies, May 11, 2012, pp. 698-703.

(Continued)

*Primary Examiner* — Lashonda T Jacobs
(74) *Attorney, Agent, or Firm* — Mannava & Kang, P.C.

(57) ABSTRACT

According to examples, an apparatus may include a processor and a memory on which is stored machine readable instructions that are to cause the processor to receive, from a first node, a client request and a response corresponding to the processed client request, in which the first node is configured to generate the response by processing the client request on a service and processed client request is configured to change a state of the service. The instructions are also to cause the processor to receive, from the first node, a response corresponding to the received request, generate an entry including the received request and response, commit the generated entry into a journal, and send an acknowledgement of the received request and response to the first node after the generated entry is committed into the journal.

20 Claims, 7 Drawing Sheets

(56) References Cited

U.S. PATENT DOCUMENTS

| | | | |
|---|---|---|---|
| 7,870,248 B2* | 1/2011 | Thiel | H04L 41/0668 |
| | | | 709/223 |
| 8,073,934 B1 | 12/2011 | Zhong et al. | |
| 8,090,880 B2* | 1/2012 | Hasha | H04L 67/1095 |
| | | | 709/251 |
| 8,650,155 B2* | 2/2014 | Corbin | G06F 9/466 |
| | | | 707/615 |
| 9,298,788 B1 | 3/2016 | Kekre et al. | |
| 9,304,815 B1* | 4/2016 | Vasanth | G06F 11/006 |
| 9,317,521 B1 | 4/2016 | Bent et al. | |
| 9,396,206 B2* | 7/2016 | Lacapra | H04L 67/104 |
| 9,647,917 B2* | 5/2017 | Hasha | H04L 67/1095 |
| 9,971,822 B1* | 5/2018 | Deardeuff | G06F 9/466 |
| 9,990,391 B1* | 6/2018 | Cole | G06F 16/2365 |
| 10,031,935 B1* | 7/2018 | Cole | G06F 16/278 |
| 10,108,658 B1* | 10/2018 | Cole | G06F 16/2365 |
| 10,324,905 B1* | 6/2019 | Ross | G06F 16/23 |
| 10,346,434 B1* | 7/2019 | Morkel | G06F 16/27 |
| 10,423,493 B1* | 9/2019 | Vig | G06F 16/2322 |
| 2004/0199812 A1 | 10/2004 | Earl et al. | |
| 2008/0288646 A1* | 11/2008 | Hasha | H04L 67/1095 |
| | | | 709/228 |
| 2009/0132615 A1* | 5/2009 | Shinozaki | G06F 11/1451 |
| 2009/0157766 A1 | 6/2009 | Shen et al. | |
| 2012/0166407 A1* | 6/2012 | Lee | G06F 16/2365 |
| | | | 707/703 |
| 2012/0297249 A1 | 11/2012 | Yang et al. | |
| 2015/0260411 A1* | 9/2015 | Querejeta Andueza | |
| | | | F24C 3/103 |
| | | | 99/331 |
| 2015/0277969 A1* | 10/2015 | Strauss | G06F 9/466 |
| | | | 707/703 |
| 2016/0321296 A1* | 11/2016 | Kakivaya | G06F 16/275 |
| 2018/0365088 A1* | 12/2018 | Nakaike | G06F 9/547 |
| 2019/0036798 A1* | 1/2019 | Fu | H04L 41/0677 |

OTHER PUBLICATIONS

Yi, et al., "Reducing Costs of Spot Instances via Checkpointing in the Amazon Elastic Compute Cloud", In Proceedings of the IEEE 3rd International Conference on Cloud Computing, Jul. 5, 2010, 8 pages.

Jangjaimon, et al., "Effective Cost Reduction for Elastic Clouds under Spot Instance Pricing through Adaptive Checkpointing", In Journal of IEEE Transactions on Computers, vol. 64, Issue 2, Feb. 2015, 3 pages.

Yousef, et al., "Tenant Level Checkpointing of Meta-data for Multi-tenancy SaaS", In Proceedings of IEEE 8th International Symposium on Service Oriented System Engineering, Apr. 7, 2014, pp. 148-153.

Khatua, et al., "A Novel Checkpointing Scheme for Amazon EC2 Spot Instances", In Proceedings of 13th IEEE/ACM International Symposium on Cluster, Cloud, and Grid Computing, May 13, 2013, pp. 180-181.

Fussell, et al., "Overview of Azure Service Fabric", https://docs.microsoft.com/en-us/azure/service-fabric/service-fabric-overview, Published on: Jan. 5, 2017, 8 pages.

"International Search Report and Written Opinion Issued in PCT Application No. PCT/US2018/034983", dated Aug. 28, 2018, 12 Pages.

\* cited by examiner

SERVICE STATE PRESERVATION ACROSS NODES

BACKGROUND

A distributed system, such as a cluster of computing nodes, hosts a number of services that are available to clients. The hosting of services across a cluster of computing nodes enables performance of dynamic load-balancing as demand on the computing nodes varies, as computing node failures occur, as well as for changes in computing node scale. In order for the computing nodes in the cluster to provide reliable fault tolerance, a backup computing node provides the same service states as a primary computing node in the event of a primary computing node failure.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
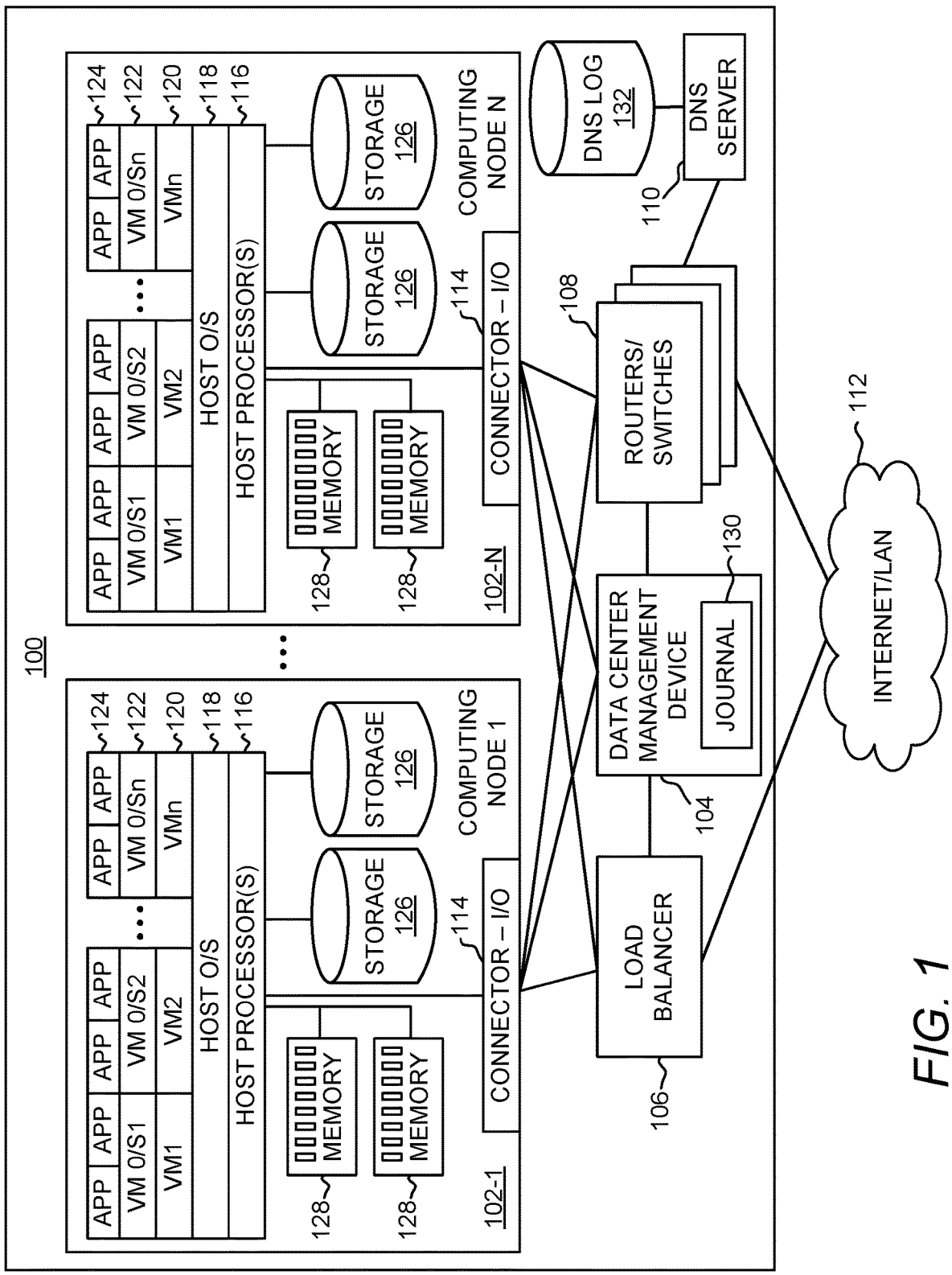
FIG. 1 shows a block diagram of an example data center in which features of the present disclosure may be implemented in accordance with an embodiment of the present disclosure.

For simplicity and illustrative purposes, the present disclosure is described by referring mainly to embodiments. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are systems and methods to preserve the state of a primary service provided by a primary replica node on a secondary service provided by a secondary replica node. Particularly, a client may communicate with and access the primary service while the primary replica node is online, e.g., operating properly, accessible by the client, etc. The secondary replica node may provide the secondary service as a backup to the primary service such that if the primary replica node goes offline, e.g., fails, is shutdown, etc., the secondary replica node is promoted to become the primary replica node and the secondary service responds to client requests. As discussed herein, the secondary service is updated to be in the same state as the primary service such that if the primary replica node goes offline, the secondary service preserves the state of the primary service. In this regard, the promoted secondary replica node provides the same response to a client request that the primary replica node would have provided immediately prior to the primary replica node going offline.

In the systems and methods disclosed herein, the primary replica node may receive a request from a client, may process the request on a service running on the primary replica node, and may generate a response to the processed request. The processing of the client request on the service may result in a change to the state of the service and the response may be an answer, an indication that the request was processed, and/or the like. The primary replica node may also send the client request and the response to a management device and the management device may generate and commit an entry including the client request and the response into a journal. After the entry is committed, the management device may also send back an acknowledgement to the primary replica node. In response to receipt of the acknowledgement, the primary replica node may send the generated response to the client. That is, the primary replica node may send the generated response after receiving the acknowledgement such that the primary replica node does not send the generated response to the client unless it is confirmed that the request/response pair has been committed to the journal.

According to embodiments, the client assigns a sequence number to each of the requests that the client submits to the primary replica node and the primary replica node processes the requests in sequential order corresponding to the sequence numbers assigned to the requests. The primary replica node may communicate the sequence numbers with the request/response pairs to the management device and the management device may commit the request/response pairs to the journal in the order of the sequence numbers. The secondary replica node may also process the client requests on the secondary service in the order in which the client requests are identified in the journal entries. By processing the requests in the same order, the secondary service has the same state as the primary service once the second replica node has processed all of the requests. In instances in which the secondary replica node is promoted to be the primary replica node, the promoted secondary replica node may process any requests identified in the journal that the secondary replica node has not processed prior to the promotion being completed such that the secondary service has the same state as the primary service at the moment that the primary replica node went offline.

According to examples, the management device may instruct the secondary replica node to process the client requests when the management device commits the request/response pairs to the journal. In other examples, the management device may instruct the secondary replica node to process the client requests asynchronously with respect to the management device committing the request/response pairs to the journal. For instance, the management device may instruct the secondary replica node to process the client requests following the secondary replica node being promoted to be the primary replica node. In yet other examples, the secondary replica node may access the journal, for instance, at regular intervals, and may process any unprocessed requests identified during the journal access.

A technical problem associated with conventional primary replica node fault tolerance methods and apparatuses is that the secondary replica nodes may not be in the same state as the primary replica node when the primary replica node fails or may require a relatively long period of time to reach the same state. This may result in a disruption in services that the primary and secondary replica nodes provide and thus, a decrease in the efficiencies at which the secondary replica nodes operate during a failover. In addition, in conventional fault tolerance methods, the secondary replica nodes may not be aware of the state of the service provided by the primary replica node at the time of the primary replica node failure and may thus return incorrect and/or outdated responses to user requests.

Through implementation of the nodes, management devices, and methods disclosed, the secondary service provided by a secondary replica node that is promoted to function as the primary replica node may be guaranteed to have the same state as the primary service provided by the primary replica node at the time the primary replica node goes offline. As such, technical solutions to the technical problems noted above may be that the secondary replica node may be promoted to function at the same state as the primary replica node at the time of the primary replica node failure in an efficient and accurate manner. In instances in which the promoted secondary replica node has processed each of the requests identified in the journal prior to being promoted, the promoted secondary replica node may immediately function as the primary replica node. In these instances, in the event that the primary replica node goes offline, the promoted secondary replica node may function as the primary replica node with a relatively small amount of disruption in the delivery of the service to a client and while providing the same responses. In other instances, the promoted secondary replica node may process each of the client requests in the order in which the client requests are listed in the journal once the secondary replica node is promoted such that the secondary service is in the same state as the primary service when the primary replica node goes offline. In any of these instances, the secondary replica node may begin processing the client requests independently of the primary replica node and thus, a failure of the primary replica node does not affect the state of the secondary service provided by the secondary replica node.

Although particular reference is made throughout the present disclosure to a single secondary replica node, it should be understood that any number of nodes may be implemented as secondary replica nodes to the primary replica node. As such, for instance, a selection of a secondary replica node may be made from multiple secondary replica nodes when a secondary replica node is promoted to be the primary replica node.

With reference first to FIG. 1, there is shown a block diagram of an example data center 100 in which features of the present disclosure may be implemented. It should be understood that the data center 100 depicted in FIG. 1 may include additional components and that some of the components described herein may be removed and/or modified without departing from a scope of the data center 100.

Generally speaking, the data center 100 provides cloud computing services or distributed computing services. The data center 100 includes a plurality of computing nodes 102, e.g., servers, blades, etc., a data center management device 104, a load balancer 106, routers/switches 108, and a Domain Name System (DNS) server 110. The data center management device 104 (which is also referenced herein as a management device 104) may manage the computing nodes 102 and the load balancer 106 may distribute requests and workloads over the computing nodes 102 to avoid situations in which any of the computing nodes 102 may become overloaded. The load balancer 106 may also maximize available capacity and performance of the computing nodes 102. The routers/switches 108 support data traffic between the computing nodes 102 and between the data center 100 and external resources and users (not shown) via an external network 112, which may be, for example, a local area network (LAN) or the Internet.

The computing nodes 102 may be standalone computing devices and/or they may be configured as individual blades in a rack of one or more server devices. The computing nodes 102 have an input/output (I/O) connector 114 that manages communication with other data center 100 entities. One or more host processors 116 on each computing node 102 run a host operating system (O/S) 118 that may support multiple virtual machines (VM) 120. Each VM 120 may run its own O/S so that each VM O/S 122 on a computing node 102 is different, or the same, or a mix of both. The VM O/S's 122 may be, for example, different versions of the same 0/S (e.g., different VMs running different current and legacy versions of the Windows® operating system). In addition, or as another example, the VM O/S's 122 may be provided by different manufacturers (e.g., some VMs run the Windows® operating system, while others VMs run the Linux® operating system). Each VM 120 may also run one or more applications (App) 124. Each of the computing nodes 102 may also include storage 126 (e.g., hard disk drives (HDD)) and memory 128 (e.g., RAM) that the host processors 116 and the VMs 120 may access and use for storing software code, data, etc.

The data center 100 provides pooled resources on which clients may dynamically provision and scale applications 124 as needed without having to add servers or additional networking. This allows clients to obtain computing resources without having to procure, provision, and manage infrastructure on a per-application, ad-hoc basis. The data center 100 allows clients to scale up or scale down resources dynamically to meet their current needs. For example, a client may initially use one VM 120 on a computing node 102-1 to run their applications 124. When demand for an application 124 increases, additional VMs 120 may be activated in the data center 100 on the same computing node 102-1 and/or on a new computing node 102-N as needed (the variable "N" may represent an integer value that is greater than 1). These additional VMs 120 may be deactivated if demand for the application 124 later drops.

The data center 100 may offer guaranteed availability, disaster recovery, and back-up services. For example, the management device 104 may designate a partition on one VM 120 of a first computing node 102-1 as the primary replica for an application 124, which is also referenced herein as a service or a primary service. The management device 104 may also designate a second partition on another VM 120 of the same computing node 102-1 or of a different computing node 102-N as a secondary replica of the application 124, e.g., as a standby or back-up in case the first VM 120 or the first computing node 102-1 fails. The application 124 provided by the secondary replica is also referenced herein as a secondary service. In some examples, the partition having the primary replica may be stored on a different computing node than the computing node that stores the partition having the secondary replica to guarantee failover in case of a computing node failure. Additionally, as used herein, a first node may be defined as a computing node on which the primary replica is stored and a second node may be defined as a computing node on which the secondary replica is stored. Moreover, for increased redundancy, the management device 104 may designate multiple partitions on VMs 120 of multiple computing nodes 102-2 to 102-N as secondary replicas to the primary replica.

The management device 104 may send incoming client requests, which may be HTTP requests, to the primary replica, e.g., first node, without also sending the incoming client requests to the secondary replica, e.g., second node. In this regard, when the primary replica is functioning properly, the secondary replica does not receive the client requests and does not process the client requests nor send responses to the client requests. Instead, the primary replica communicates with clients and processes client requests on a primary service and the secondary replica may thus not be exposed to clients.

However, as discussed herein, the management device 104 may maintain a state of a secondary service, e.g., a state of a back-up copy of an application 124, provided by the secondary replica to be consistent with the state of the primary service 124 provided by the primary replica. That is, the management device 104 implements operations that cause the secondary replica N to preserve the state of the primary service 124 in the event that the primary replica 102-1 fails or is otherwise removed from functioning as the primary replica, e.g., is shutdown or is replaced by a secondary replica. As such, in the event that the primary replica ceases to function as the primary replica, the secondary service 124 provided by the secondary replica that replaces the primary service provided by the primary replica may have the same state as the primary service when the primary replica ceased to function as the primary replica. In this regard, responses generated through processing of client requests on the secondary service are equivalent to the responses resulting from processing of client requests on the primary service.

The management device 104 may automatically shift incoming client requests from the primary replica to the secondary replica without requiring client intervention. The shift in incoming client requests also occurs without a significant disruption in the services that the client receives. For instance, the shift may result in a relatively short delay of a few milliseconds to a few seconds in the services. Moreover, as the state of the secondary service 124 is made to be the same as the state of the primary service 124, the processing of the client requests by the secondary replica will result in the same responses as would have been generated had the client requests been processed by the primary replica.

The client requests may be requests for data that either change or do not change the state of the primary service. An example of a request that does not change the state of the service may be a request for information stored in the storage 126 that the primary service may access. An example of a request that changes the state of the primary service may be a request to write data to or replace data stored in the storage 126 that the primary service accesses. In any regard, when the primary replica receives a request, the primary replica may process the request such as by performing an operation as identified in the request, which may include writing data to the storage 126, reading information from the storage 126, etc. The primary replica may also generate a response to the request, in which the response may include requested information and/or an acknowledgement that the requested operation on the stored data has been performed.

According to examples, the non-state changing and the state changing requests may each be assigned a sequence number and the primary replica may process each of the requests in order. As discussed in greater detail herein, the primary replica may further communicate the state changing requests and corresponding responses to the management device 104 such that entries including the state changing requests and corresponding responses may be stored in a journal 130. That is, non-state changing requests and corresponding responses may not be stored in the journal 130. In any regard, the management device 104 may commit entries into the journal 130 and a secondary replica may access the entries in the journal 130 to identify the requests that the secondary replica processes on the secondary service to make the secondary service have the same state as the primary service at least when the primary replica fails or otherwise ceases to function as the primary replica.

Although the data center 100 is illustrated as a single location, it will be understood that computing nodes 102 may be distributed to multiple geographic locations to provide additional redundancy and disaster recovery capabilities. Additionally, the data center 100 may be an on-premises, private system that provides services to a single enterprise user or may be a publically accessible, distributed system that provides services to multiple, unrelated clients and tenants or may be a combination of both.

The Domain Name System (DNS) server 110 resolves domain and host names into IP addresses for all roles, applications, and services in the data center 100. A DNS log 132 maintains a record of which domain names have been resolved by role. It will be understood that DNS is used herein as an example and that other name resolution services and domain name logging services may be used to identify dependencies. For example, in other embodiments, IP or packet sniffing, code instrumentation, or code tracing may be used to identify dependencies.

Figure 2A:
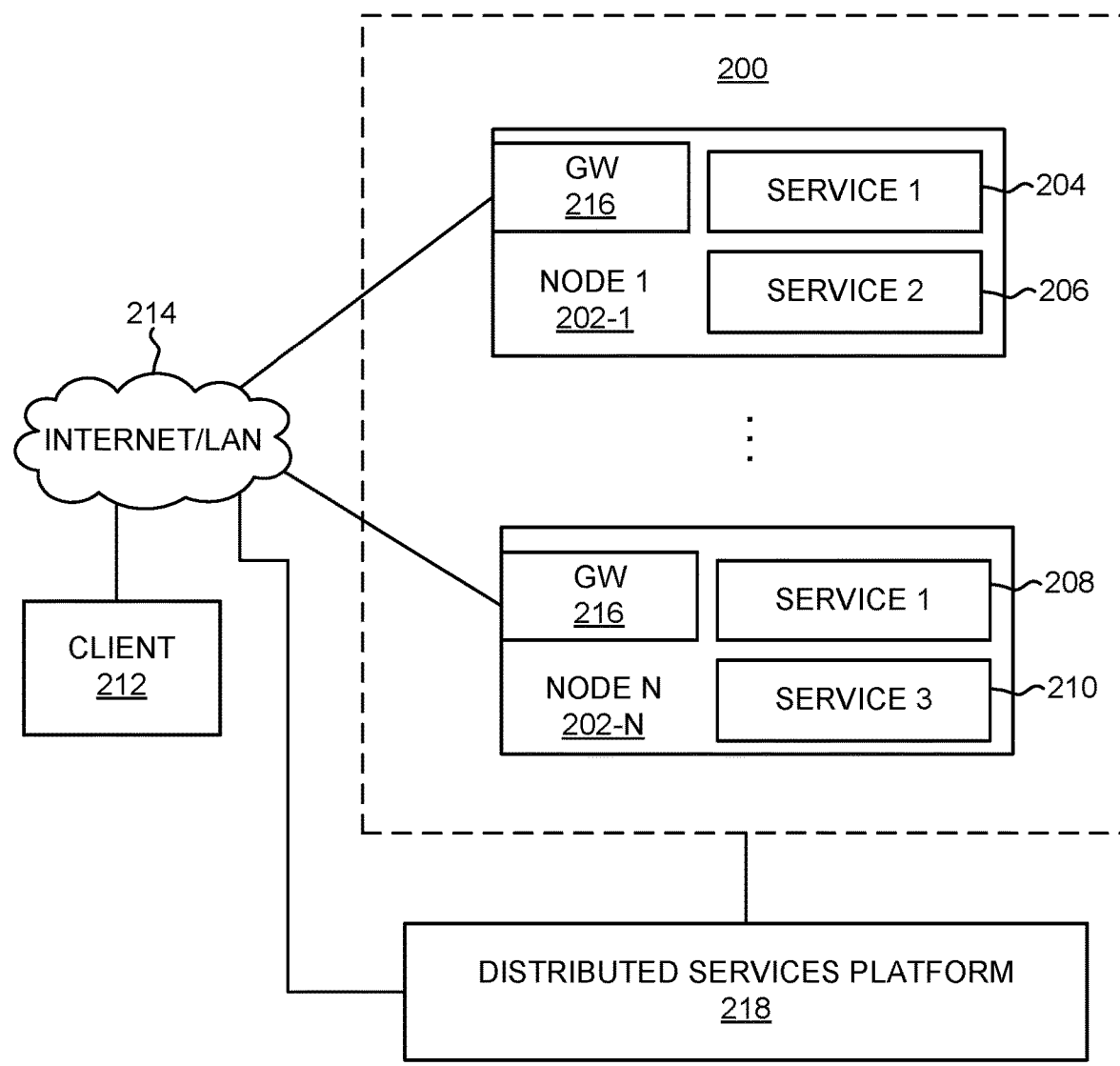
FIG. 2A shows a block diagram of a cluster composed of N nodes in accordance with an embodiment of the present disclosure.

FIG. 2A depicts a block diagram of a cluster 200 composed of N nodes 202, which may represent different servers, processors, or VMs. For example, in the example illustrated in FIG. 1, servers 102-1, processors 116, or VMs 120 may correspond to the different nodes 202. The nodes 202 may operate as part of a cluster 200 that manages various instances of services 204-210. The cluster 200 controls the service instances 204-210 running on the nodes 202 and may balance the service loads among the nodes 202. The cluster 200 also provides backup and redundancy for the service instances 204-210. In a data center environment, there may be tens of thousands of service instances deployed on a cluster 200.

Users may access the applications and service instances 204-210 deployed on the cluster 200 via a client 212, which may be an application running on a desktop, laptop, or tablet computer, on a mobile device, etc. The client 212 may communicate with the cluster 200 through a network 214, which may be a public or private data network, such as the Internet, an intranet, or a LAN. The client 212 accesses the service instances 204-210 running on the cluster 200 though a gateway 216, which is the entry point for the client 212 to access the nodes 202. In order to access a service instance 204, the client 212 connects to a gateway 216 and may register a filter to determine an endpoint assigned to a target service instance 204 running on the cluster 200. The client 212 then communicates with the target service instance 204-210.

According to embodiments, a first node 202-1 functions as a primary replica and a second node 202-N functions as a secondary replica. When the first node 202-1 fails, is taken offline, is shutdown, etc., communications from the client 212 may automatically be shifted to a service instance 208 in the second node 202-N. Thus, the client 212 communication may be shifted without client intervention and without interrupting the client communication with the service instance 208. Additionally, as discussed in greater detail herein, the state of the service instance 204 running on the primary replica 202-1 may be preserved in the service instance 208 running on the secondary replica 202-N such that responses to requests generated by the service instance 208 may be deterministic with the responses to requests generated by the service instance 204. In other words, there may be no difference in the responses generated by the service instances 204 and 208 whenever the secondary replica 202-N is caused to operate as the primary replica.

A distributed services platform 218 may support the cluster 200, in which the distributed services platform 218 may understand available infrastructure resources and requirements of the service instances running on the cluster 200. The distributed services platform 218 generally provides comprehensive runtime and lifecycle management capabilities and enables automatic updating and self-healing to ensure delivery of highly available and durable services via the cluster 200. The distributed services platform 218 supports microservices in which complex applications are composed of small, independently versioned services running at very high density on a shared pool of nodes 202, such as the cluster 200. In one example, the distributed services platform 218 may be the Azure Service Fabric provided by Microsoft Corporation®. The distributed services platform 218 manages the service instance endpoints in the cluster 200. A distributed services platform 218, such as Microsoft Corporation's Service Fabric®, is a framework for hosting services. In any regard, the distributed services platform 218 may include the management device 104 and the nodes 202 may be operated under a microservices framework.

When a new service is started on the cluster 200, the service instance is assigned an endpoint. For example, in FIG. 2A, a first instance of Service 1 (204) is assigned an endpoint on the first node 1 (202-1). A second instance of Service 1 (208) is assigned an endpoint on the second node N (202-N). Other services, Service 2 (206) and Service 3 (210) are respectively assigned endpoints on the first node 202-1 and the second node 202-N. The client 212 connects to a gateway 216 and obtains the endpoint of a target service. The service instances 204-210 may be spread across multiple nodes 202-1 and 202-N as illustrated in FIG. 2A. Over time, services may be moved due to node failure, load balancing, or variations in user demand. Accordingly, the endpoint for a target service may change over time.

Figure 2B:
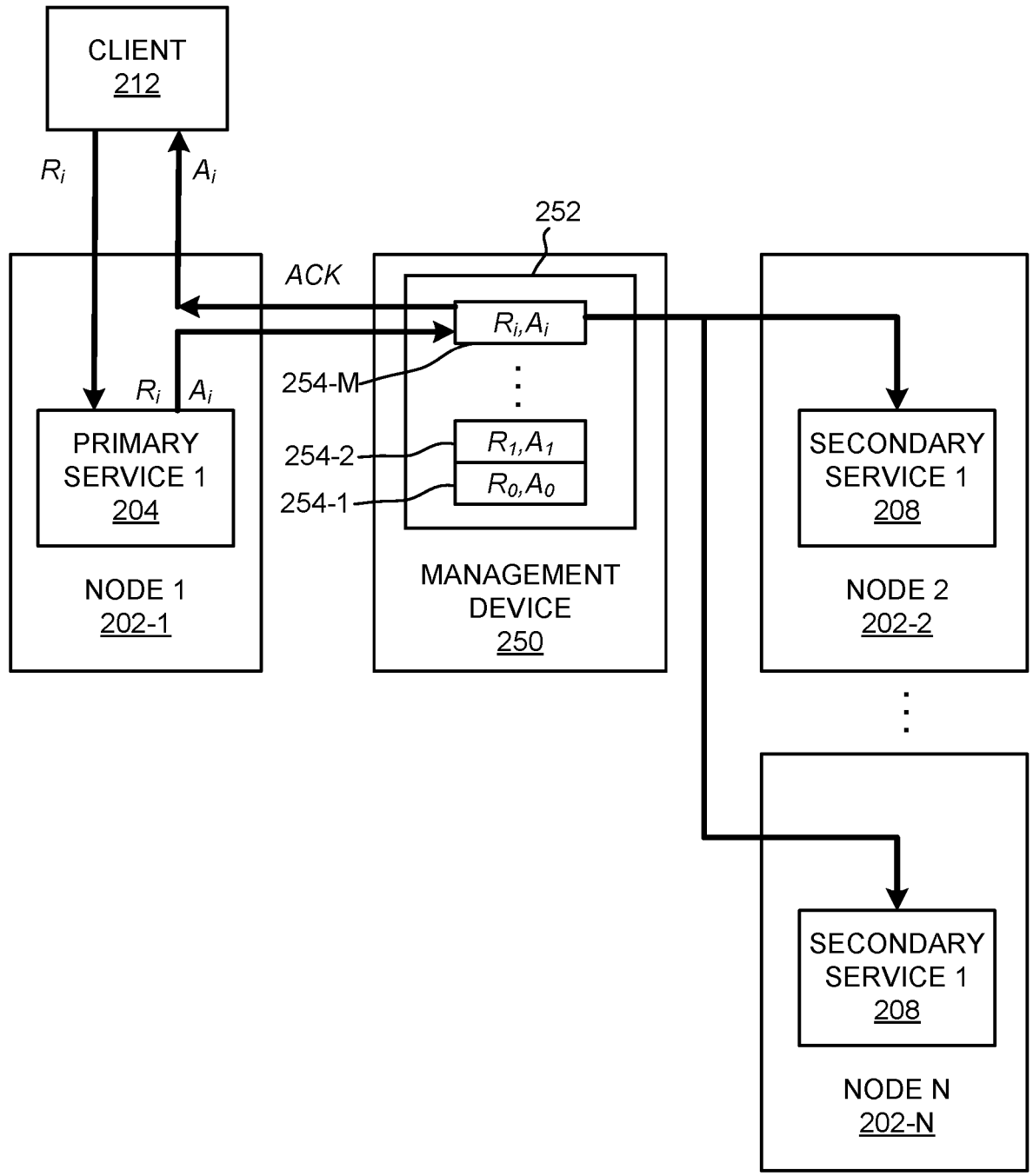
FIG. 2B shows a block diagram of a system that shows how the state of the service running on the primary replica node may be preserved across the services running on secondary replica nodes when the primary replica node goes offline in accordance with an embodiment of the present disclosure.

FIG. 2B is a block diagram of a system that shows how the state of the primary service 204 provided by the primary replica node 202-1 may be preserved across the secondary services 208 provided by secondary replica nodes 202-2 to 202-N when the primary replica node 202-1 goes offline, e.g., fails, is shutdown, etc., according to an embodiment of the present disclosure. In embodiments in which the secondary replica nodes 202-2 to 202-N are hot standbys of the primary replica node 202-1, the states of the secondary services 208 may be maintained to be identical to the state of the primary service 204 at all or nearly at all times. In embodiments in which the secondary replica nodes 202-2 to 202-N are not hot standbys of the primary replica node 202-1, the secondary services 208 may be processed to change the states of the secondary services 208 at certain periods of time and/or when the primary replica node 202-1 is determined to have gone offline. In this regard, the states of the secondary services 208 may be changed asynchronously with respect to changes in the state of the primary service 204. In any of these embodiments, as discussed in detail herein, the states of the secondary services 208 may be the same as the state of the primary service 204 to thereby preserve the state of the primary service 204 when needed.

As shown in FIG. 2B, a request ($R_i$), such as an HTTP request, may be received from a client 212 via the load balancer 106 (FIG. 1), the distributed services platform 218 (FIG. 2A), or the like. The first node 1 (202-1), which is also referenced herein as the primary replica node 202-1, and more particularly, the primary replica stored on the primary replica node 202-1, may process the request ($R_i$), which may result in a change in the state of the primary service 204. The processing of the request ($R_i$) may, for instance, result in data that the primary service 204 accesses being written, erased, and/or replaced and/or the primary service 204 itself being modified. The primary replica node 202-1 may also generate an answer ($A_i$), which is also referenced herein as a response corresponding to the request ($R_i$). The response ($A_i$) may be an acknowledgement that the request ($R_i$) has been processed and that a state of the primary service 204 has been changed. In other examples, the request ($R_i$) may not be a state-changing request and processing of the request ($R_i$) does not result in the state of the primary service 204 being changed. In these examples, the response ($A_i$) to the request may be information requested in the request.

As also shown in FIG. 2B, the primary replica node 202-1 may send the request ($R_i$) and the generated response ($A_i$) to a management device 250 instead of sending the generated response ($A_i$) directly to the client 212. The management device 250 may be equivalent to the management device 104 depicted in FIG. 1 or may be different from that management device 104. The management device 250 may maintain a journal 252 that includes entries 254-1 to 254-M, in which "M" may represent an integer value greater than one. Particularly, the management device 250 generates a respective entry 254 for each request/response pair received from the primary replica node 202-1 and commits the generated entries 254 into the journal 252. Each of the entries 254-1 to 254-M may include a respective request/response pair and may be sequentially entered into the journal 252 in the order indicated by the sequence numbers assigned to the received requests ($R_i$). In this regard, the request/response pair ($R_i$, $A_i$) having the highest sequence number may be identified as the newest entry, e.g., may be listed at the top of the order of request/response pairs 254.

After the management device 250 has committed the received request/response pair ($R_i$, $A_i$) into the journal 252, the management device 250 may send an acknowledgment regarding the received request and response to the primary replica node 202-1. The acknowledgment may include an indication that the received request and response pair has been committed to the journal 252. In response to receipt of the acknowledgment from the management device 250, the primary replica node 202-1 may send the response ($A_i$) to the client 212.

According to examples, the primary replica node 202-1 may determine whether processing of the request ($R_i$) results in a change in the state of the primary service 204. For instance, the request ($R_i$) may include an indication as to whether the processing of the request changes the state or not. In any regard, the primary replica node 202-1 may send the responses ($A_i$) corresponding to requests ($R_i$) that do not change the state of the primary service 204 directly to the client 212 without first sending the responses (A$_i$) to the management device 250. In this regard, the management device 250 may not include entries in the journal 252 corresponding to requests and responses that do not change the state of the primary service 204 as processing of those requests would not change the states of the secondary services 208.

In some embodiments, after the management device 250 has committed the received request/response pair (R$_i$, A$_i$) into the journal 252, the management device 250 may send a notification to the secondary replica nodes 202-2 to 202-N. The notification may serve to inform the secondary replica nodes 202-2 to 202-N of the request/response pair (R$_i$,A). In addition or in other examples, the secondary replica nodes 202-2 to 202-N may access the entries 254 in the journal 252 at certain intervals of time and may determine when new request/response pairs (R$_i$, A$_i$) are committed to the journal 252. In any of these examples, the secondary replica nodes 202-2 to 202-N may retrieve the request (R$_i$) in the request/response pair (R$_i$, A$_i$) from the journal 252 and may process the request (R$_i$) to change the state of the secondary services 208. In other examples, the management device 250 may send the request (R$_i$) in the request/response pair (R$_i$, A$_i$) to the secondary replica nodes 202-2 to 202-N at regular intervals of time, in response to certain conditions, in response to a failure in the primary replica node 202-1, etc. In addition, the secondary replica nodes 202-2 to 202-N, and more particularly, the secondary replicas stored on the secondary replica nodes 202-2 to 202-N, may process the request (R$_i$) in the request/response pair (R$_i$, A$_i$) to update the states of the secondary services 208 follow receipt of the notification.

The secondary replica nodes 202-2 to 202-N may process each of the requests (R$_0$-R$_i$) listed in the entries 254 in the journal 252 in sequential order such that the states of the secondary services 208 are the same as the state of the primary service 204. According to examples, the secondary replica nodes 202-2 to 202-N may process the requests (R$_0$-R$_i$) listed in the entries 254 as the secondary replica nodes 202-2 to 202-N are informed of the entries 254. In these examples, the one of more secondary replica nodes 202-2 to 202-N may function as hot standbys of the primary replica node 202-1. In other examples, the secondary replica nodes 202-2 to 202-N may process the requests (R$_0$-R$_i$) listed in the entries 254 asynchronously with the entries 254 being committed into the journal 252. That is, for instance, the secondary replica nodes 202-2 to 202-N may process any unprocessed requests at set intervals of time. In these examples, the secondary replica nodes 202-2 to 202-N may be considered to be lukewarm standbys and may require additional time if they are called up to function as the primary replica node 202-1. In any of these examples, as the primary replica node 202-1 and the secondary replica nodes 202-2 to 202-N process the same requests (R$_0$-R$_i$) and in the same sequential order, the states of the secondary services 208 may be the same as the state of the primary service 204. The processing of the requests on the secondary services 208 may cause a deterministic state transition with respect to the processing of the requests on the primary service 204. That is, for instance, given a state S and a request R, R will transition S to S' and, whenever R is applied to the same state S, the state will transition to the same new state S'.

Figure 3:
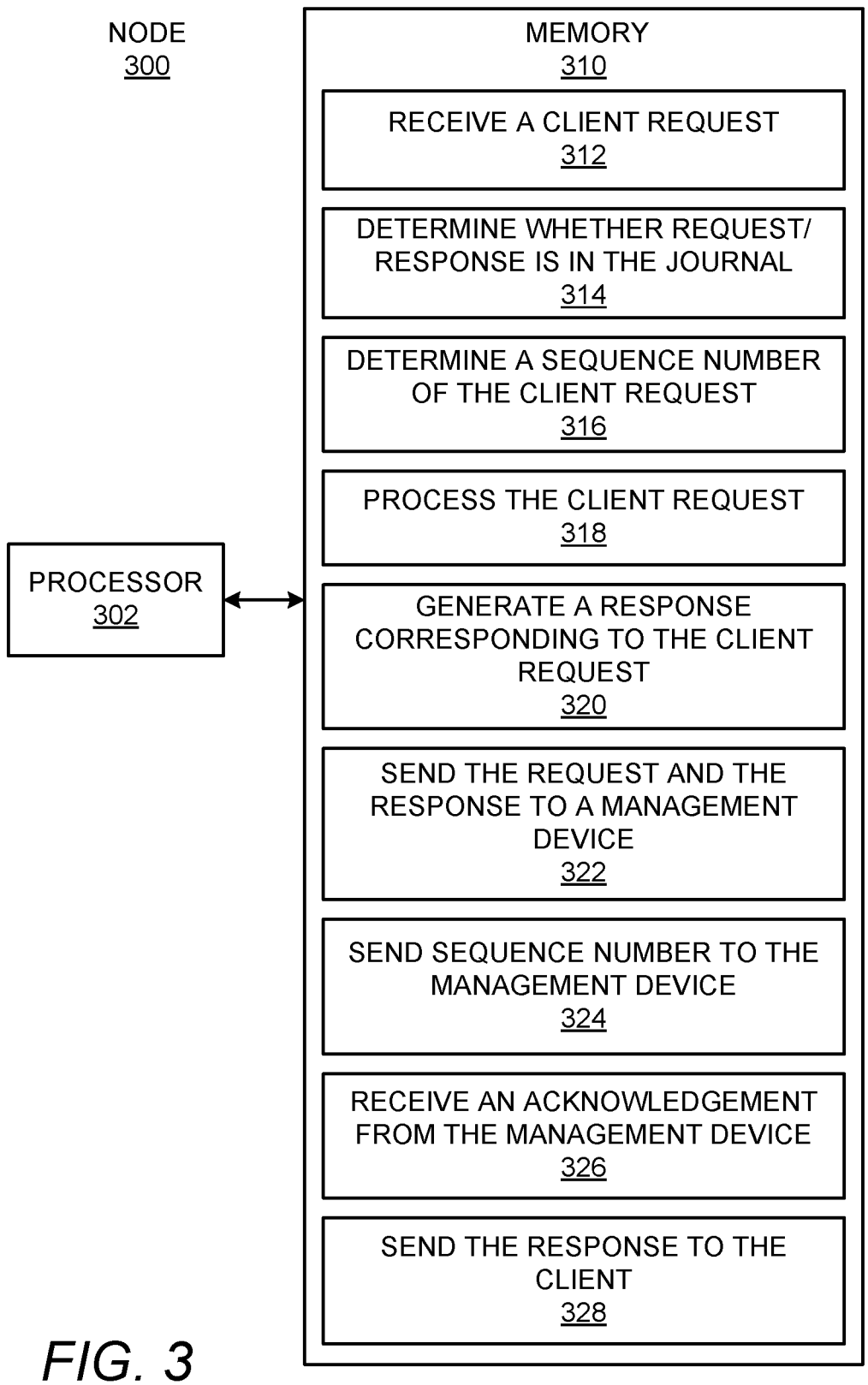
FIG. 3 shows a block diagram of a node in accordance an embodiment of the present disclosure.

Turning now to FIG. 3, there is shown a block diagram of a node 300 according to an embodiment of the present disclosure. The node 300 may be equivalent to either or both of the nodes 102-1 and 202-1 discussed above with respect to FIGS. 1, 2A, and 2B. In one regard, the node 300 may be a primary replica node. As shown, the node 300 may include a processor 302 that may control node 300 operations. The processor 302 may be a semiconductor-based microprocessor, a central processing unit (CPU), an application specific integrated circuit (ASIC), a field-programmable gate array (FPGA), and/or other hardware device.

The node 300 may also include a memory 310 that may have stored thereon machine readable instructions 312-328 (which may also be termed computer readable instructions) that the processor 302 may execute. The memory 310 may be an electronic, magnetic, optical, or other physical storage device that includes or stores executable instructions. The memory 310 may be, for example, Random Access memory (RAM), an Electrically Erasable Programmable Read-Only Memory (EEPROM), a storage device, an optical disc, and the like. The memory 310, which may also be referred to as a computer readable storage medium, may be a non-transitory machine-readable storage medium, where the term "non-transitory" does not encompass transitory propagating signals.

The processor 302 may fetch, decode, and execute the instructions 312 to receive a request from a client directed to a service running on the node 300. The processor 302 may fetch, decode, and execute the instructions 314 to determine whether the request and a corresponding response are recorded in a journal. The processor 302 may fetch, decode, and execute the instructions 316 to determine a sequence number of the request. The processor 302 may fetch, decode, and execute the instructions 318 to process the request. The processor 302 may fetch, decode, and execute the instructions 320 to generate a response to the request. The processor 302 may fetch, decode, and execute the instructions 322 to send the request and the response to a management device. The processor 302 may fetch, decode, and execute the instructions 324 to send the sequence number of the request to the management device. The processor 302 may fetch, decode, and execute the instructions 326 to receive an acknowledgement from the management device. The processor 302 may fetch, decode, and execute the instructions 328 to send the response to the client in response to receipt of the acknowledgement from the management device.

Figure 4:
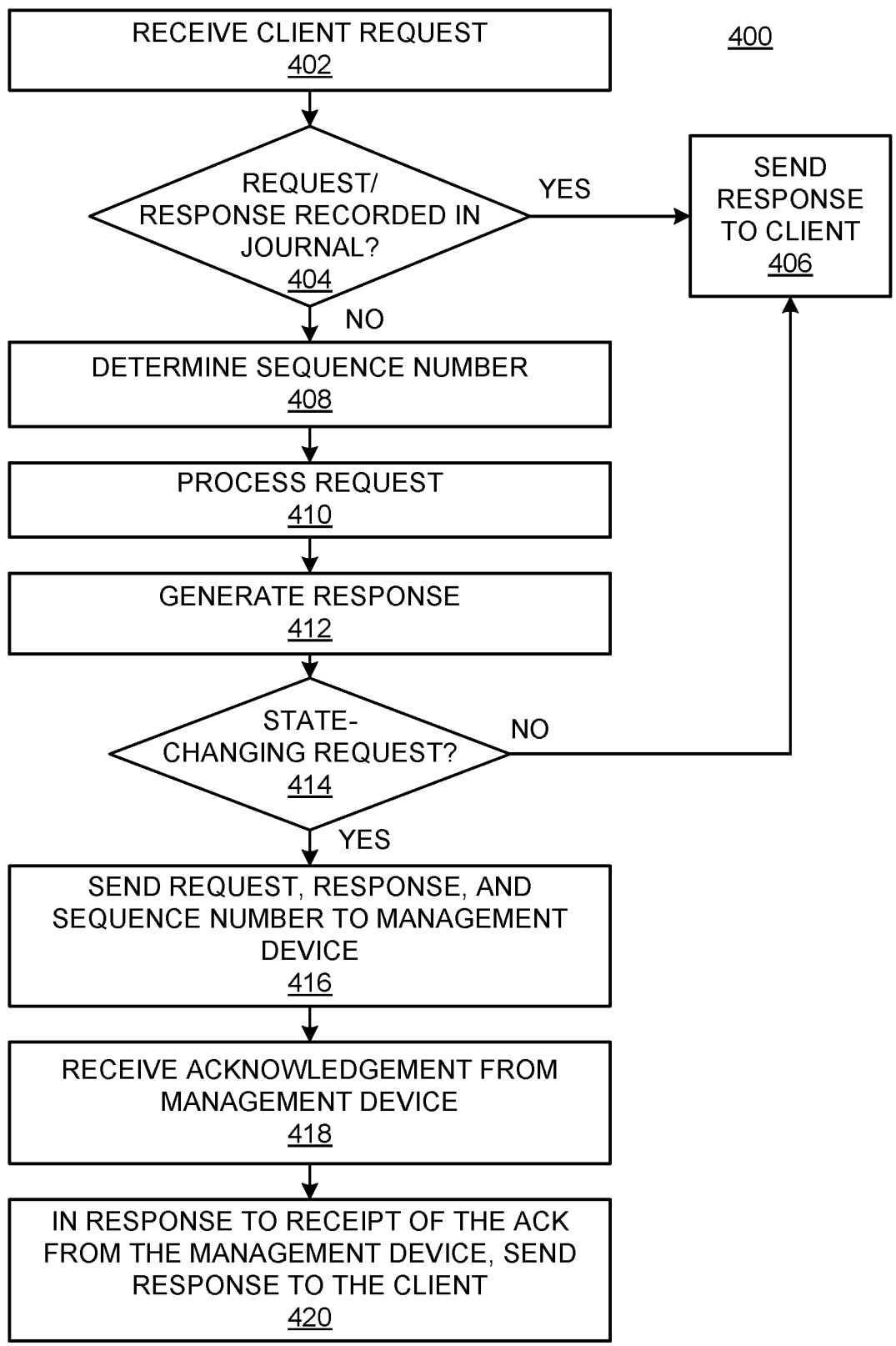
FIG. 4 depicts a flow diagram of a method for operating a node as primary replica in accordance with an embodiment of the present disclosure.

Various manners in which the node 300 may operate are discussed in greater detail with respect to the method 400 depicted in FIG. 4. Particularly, FIG. 4 depicts a flow diagram of a method 400 for operating a node 300 as a primary replica according to an example of the present disclosure. It should be understood that the method 400 depicted in FIG. 4 may include additional operations and that some of the operations described therein may be removed and/or modified without departing from a scope of the method 400. The description of the method 400 is made with reference to the features depicted in FIGS. 1-3 for purposes of illustration.

At block 402, the processor 302 may execute the instructions 312 to receive a request from a client 212 directed to a primary service 204 that the node 300 provides. For instance, the management device 104 may receive a client request directed to a primary service 204, e.g., an application 124, that a VM 120 on the node 300 provides. The primary service 204 may be a standalone service or a microservice in a microservices framework. As discussed above, one or more other nodes may be operated as secondary replica nodes (e.g., 202-2 to 202-N) to the node 300. In these examples, the one or more other nodes may run identical versions of the primary service 204. As also discussed above, the management device 104 may only send the client request to the node 300 as that node is the primary replica node. In this regard, the management device 104 does not send the client request to the one or more other nodes that operate as secondary replica nodes.

At block 404, the processor 302 may execute the instructions 314 to determine whether the received request and a response corresponding to the received request are recorded in the journal 252. That is, for instance, the processor 302 may determine whether the client 212 submitted a duplicate request as may occur in instances in which the client 212 submitted an original request and did not receive a response. Additionally, the request may have been processed on the primary service 204, which resulted in a change to the state of the primary service 204, and a response corresponding to the changed state may have been recorded to the journal 252 prior to the response being communicated to the client 212 as may occur if there is problem with the network. The processor 302 may perform the check at block 404 to ensure that the same request is not applied to the primary service 204 because application of the same request multiple times may corrupt the primary service 204. Instead, ensuring that any request be applied only once allows the state changing requests to be idempotent, e.g., the same response may be returned for the same state-changing request regardless of the number of times the client sends the state-changing request.

In response to a determination at block 404 that the received request and corresponding response are recorded in the journal 252, the processor 302 may execute the instructions 328 to send the response to the client 212 as indicated at block 406. In this regard, the processor 302 may instruct the node 300 to send a previously generated response to the client 212 at block 406.

However, in response to a determination at block 404 that the received request and corresponding response are not recorded in the journal 252, the processor 302 may execute the instructions 316 to determine a sequence number assigned to the received request. The client 212 may assign the sequence number to the request and may submit the sequence number with the request.

At block 410, the processor 302 may execute the instructions 318 to process the received request on the primary service 204. The processor 302 may process the received request in turn with respect to any other received requests. That is, the processor 302 may determine whether the sequence number assigned to the received request is a next number in a sequence of numbers corresponding to received requests. For instance, if the sequence number of a most recently processed request is 5 and the sequence number assigned to the received request is 7, the processor 302 may determine that the sequence number assigned to the received request is not the next number in the sequence of numbers. In the event that the processor 302 determines that the sequence number assigned to the received request is not the next number in the sequence of numbers, the processor 302 may wait to process the request received at block 402 until the processor 302 has processed all of the requests that precede that request.

The processor 302 may process the received request by performing an operation on the primary service 204 as indicated in the received request. The operation may be an operation that changes a state of the primary service 204 or an operation that does not change the state of the primary service 204. Operations that change the state of the primary service 204 may include operations that change the data that the primary service 204 accesses, such as write, erase, replace, etc., types of operations and/or operations that change the primary service 204 itself. Operations that do not change the state of the primary service 204 may include operations that are requests for information that the primary service 204 accesses. At block 410, the processor 302 may determine the requested information in the received request and/or may change the state of the primary service 204.

At block 412, the processor 302 may execute the instructions 320 to generate a response to the received request. As examples, the response may include the requested information and/or an acknowledgement that the state of the primary service 204 is changed as requested in the received request.

At block 414, the processor 302 may determine whether the request is a state-changing request. For instance, the request may include an indication as to whether application of the request will change the state of the primary service 204. In response to a determination that the request is not a state-changing request, at block 410, the processor 302 may execute the instructions 328 to send the generated response to the client 212. For instance, the processor 302 may send the generated response through routers/switches 108 and over a network 112 to the client 212.

However, in response to a determination at block 414 that the request is a state-changing request, the processor 302 may execute the instructions 322 to send the request and the generated response to the management device 250. The processor 302 may also execute the instructions 324 to send the sequence number assigned to the request to the management device 250. As discussed in greater detail herein with respect to the management device 250, the management device 250 is to commit an entry 254 including the request, the response, and the sequence number in a journal 252 and to send an acknowledgement to the node 300 after the entry 254 is committed to the journal 252.

At block 418, the processor 302 may execute the instructions 326 to receive an acknowledgement from the management device 250. The acknowledgement may indicate that the entry 254 is committed to the journal 252.

At block 420, in response to receipt of the acknowledgement from the management device 250, the processor 302 may execute the instructions 328 to send the response generated at block 412 to the client 212. That is, for a request that changes a state of the primary service 204, the processor 302 is to wait until the acknowledgement from the management device 250 that a request/response pair is committed to the journal 252 before the processor 302 sends the response to the client 212. In this regard, if there is failure in the node 300 after the response is sent to the client 212, the state of the primary service 204 may be determined from the journal 252 and the secondary replica node 202-2 may send the same response to the client 212. In this example, because the journal 252 logs the request and response prior to the response being sent to the client, a secondary replica node 202-2 may replicate the same state for the secondary service 208 and may thus generate the same response. In addition, the secondary replica node 202-2 may compare its generated response with the response stored in the journal 252 to ensure that there are no discrepancies in the responses and thus no discrepancies in the states of the primary and secondary services 204, 208. Moreover, the responses from the primary replica node 202-1 may be compared with the responses from the secondary replica node 202-2 to determine whether there are any discrepancies such that, if there are discrepancies, a determination may be made that the state/request interactions are not deterministic.

The node 300 may repeat the method 400 in a continuous manner as additional requests are received at block 402 or until the node 300 ceases to function as the primary replica node.

Figure 5:
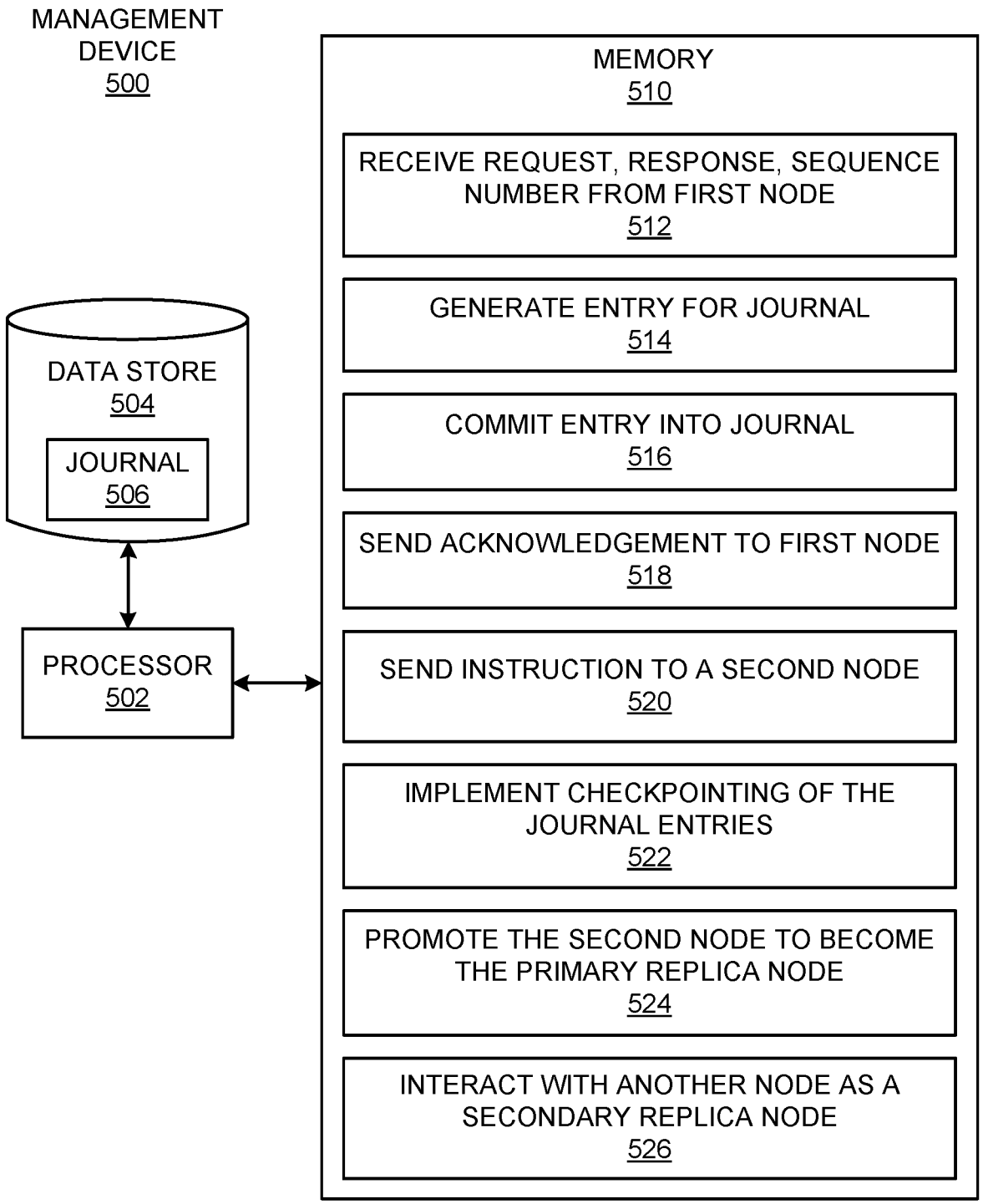
FIG. 5 shows a block diagram of a management device in accordance an embodiment of the present disclosure.

Turning now to FIG. 5, there is shown a block diagram of a management device 500 according to an embodiment of the present disclosure. The management device 500 may be equivalent to either or both of the management devices 104 and 250 discussed above with respect to FIGS. 1 and 2B. As shown, the management device 500 may include a processor 502 that may control the management device's 500 operations. The processor 502 may be a semiconductor-based microprocessor, a central processing unit (CPU), an application specific integrated circuit (ASIC), a field-programmable gate array (FPGA), and/or other hardware device. The processor 502 may communicate with the data store 504, which may store a journal 506 and may be Random Access memory (RAM), an Electrically Erasable Programmable Read-Only Memory (EEPROM), a storage device, an optical disc, and the like.

The management device 500 may also include a memory 510 that may have stored thereon machine readable instructions 512-526 (which may also be termed computer readable instructions) that the processor 502 may execute. The memory 510 may be an electronic, magnetic, optical, or other physical storage device that includes or stores executable instructions. The memory 510 may be, for example, Random Access memory (RAM), an Electrically Erasable Programmable Read-Only Memory (EEPROM), a storage device, an optical disc, and the like. The memory 510, which may also be referred to as a computer readable storage medium, may be a non-transitory machine-readable storage medium, where the term "non-transitory" does not encompass transitory propagating signals.

The processor 502 may fetch, decode, and execute the instructions 512 to receive a request, a response, and a sequence number for the request from a first node 202-1, which may be a primary replica node. The processor 502 may fetch, decode, and execute the instructions 514 to generate an entry 254-M for recordation into the journal 506. The journal 506 may be equivalent to the journals 130, 252 depicted in FIGS. 1 and 2B. The processor 502 may fetch, decode, and execute the instructions 516 to commit a generated entry into the journal 506. The processor 502 may fetch, decode, and execute the instructions 518 to send an acknowledgment to the first node 202-1. The processor 502 may fetch, decode, and execute the instructions 520 to send an instruction to a secondary replica node 202-2. The processor 502 may fetch, decode, and execute the instructions 522 to implement checkpointing of the journal entries 254. The processor 502 may fetch, decode, and execute the instructions 524 to promote the secondary replica node 202-2 to replace and become the primary replica node. The processor 502 may fetch, decode, and execute the instructions 526 to interact with another node as a secondary replica node.

Figure 6:
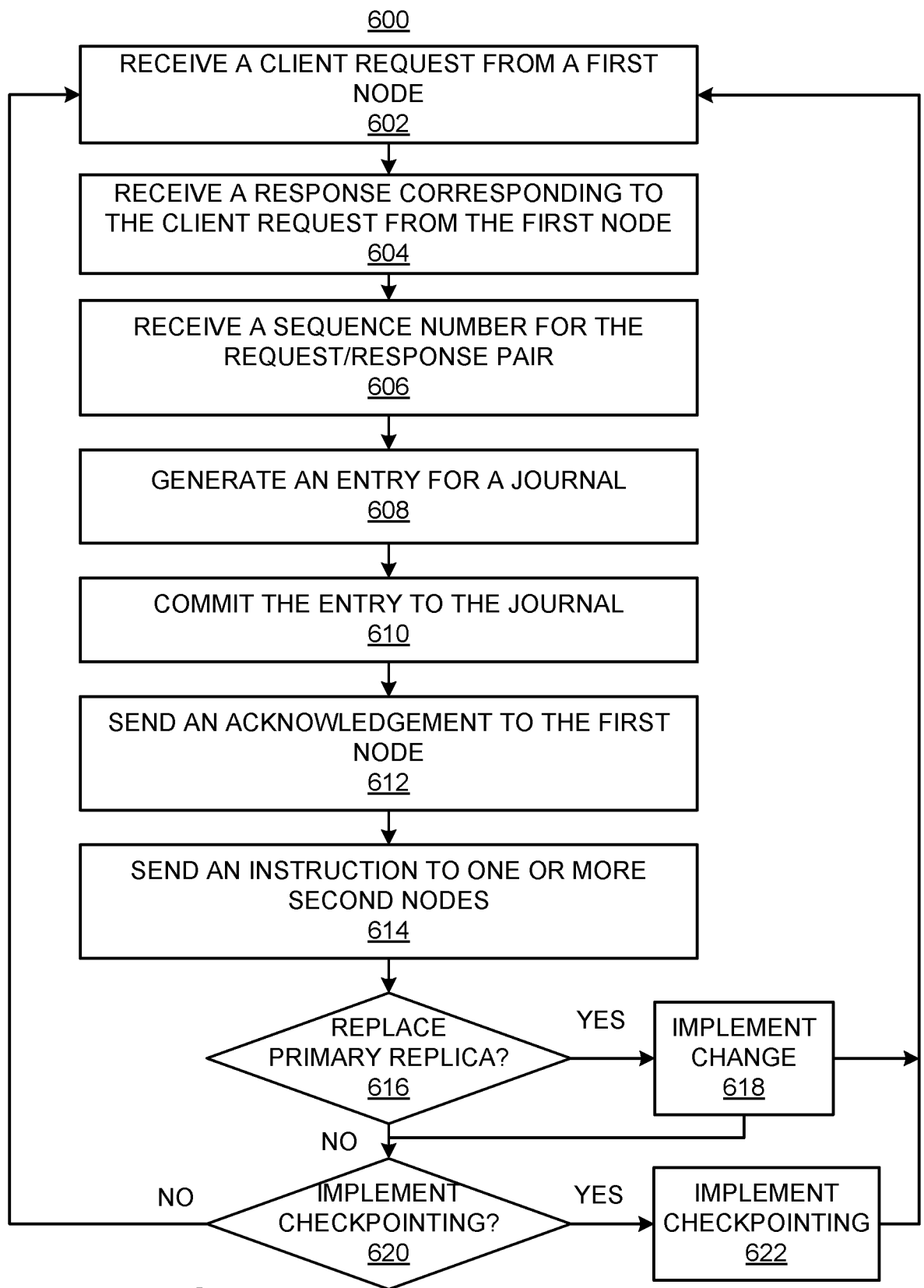
FIG. 6 depicts a flow diagram of a method for operating a management device to maintain states of services across a primary replica node and a secondary replica node in accordance with an embodiment of the present disclosure.

Various manners in which the management device 500 may operate are discussed in greater detail with respect to the method 600 depicted in FIG. 6. Particularly, FIG. 6 depicts a flow diagram of a method 600 for operating a management device 500 to maintain states of primary and secondary services 204, 208 across a primary replica node 202-1 and a secondary replica node 202-2 according to an example of the present disclosure. It should be understood that the method 600 depicted in FIG. 6 may include additional operations and that some of the operations described therein may be removed and/or modified without departing from the scopes of the method 600. The description of the method 600 is made with reference to the features depicted in FIGS. 1-3 for purposes of illustration.

At block 602, the processor 502 may execute the instructions 512 to receive a request ($R_i$) from a first node 202-1, which may also be a primary replica node. As discussed above, the request ($R_i$) may be a state-changing request received from a client 212 that when processed by the primary replica node 202-1 changes a state of a primary service 204 running on the primary replica node 202-1.

At block 604, the processor 502 may execute the instructions 512 to receive a response ($A_i$) from the primary replica node 202-1. The response ($A_i$) may correspond to the request ($R_i$) and may be an acknowledgment that the request ($R_i$) has been processed and that a state of the service 204 running on the primary replica node 202-1 has been changed.

At block 606, the processor 502 may execute the instructions 512 to receive a sequence number for the request/response pair ($R_i$,A). The sequence number for the request/response pair ($R_i$, $A_i$) may be a sequence number that the client assigned to the request. In any regard, the processor 502 may use the sequence number to distinguish the request/response pair other request/response pairs. Although blocks 602-606 are recited as separate operations, it should be understood that blocks 602-606 may be implemented as a single operation, e.g., the processor 502 may receive the request, response, and sequence number as a single communication from the primary replica node 202-1.

At block 608, the processor 502 may execute the instructions 514 to generate an entry 254-M including the received request/response pair ($R_i$, $A_i$) for recordation into a journal 506. The entry 254-M may also identify the received sequence number for the request/response pair ($R_i$,A).

At block 610, the processor 502 may execute the instructions 516 to commit the entry 254-M generated at block 608 into the journal 506. For instance, the processor 502 may insert the generated entry 254-M in sequential order with respect to previously inserted entries 254 in the journal 506 according to the sequence number assigned to the received request.

At block 612, after the processor 502 has committed the generated entry 254-M to the journal 506, the processor 502 may send an acknowledgment to the primary replica node 202-1. The acknowledgment may include an indication that the received request/response pair ($R_i$, $A_i$) has been committed to the journal 506.

At block 614, the processor 502 may execute the instructions 520 to send an instruction to a secondary replica node 202-2 regarding the committed request/response pair ($R_i$,A). As discussed above with respect to FIG. 2B, in response to receipt of the instruction, the secondary replica node 202-2 may either immediately upon receipt or at a later time, process the request ($R_i$) in the request/response pair ($R_i$, $A_i$) such that the state of the secondary service 208 running on the secondary replica node 202-2 is the same as the state of the primary service 204 running on the primary replica node 202-1.

At block 616, the processor 502 may execute the instructions 524 to determine whether the primary replica node 202-1 is to be replaced with the secondary replica node 202-2. The processor 502 may determine that the primary replica node 202-1 is to be replaced in instances in which the primary replica node 202-1 has failed or is otherwise malfunctioning. The processor 502 may also determine that the primary replica node 202-1 is to be replaced when, for instance, the primary replica node 202-1 is shutdown for upgrading, maintenance, replacement, etc.

In response to a determination that the primary replica node 202-1 is to be replaced, at block 618, the processor 502 may execute the instructions 524 to promote the secondary replica node 202-2 to become the primary replica node. For instance, the processor 502 may instruct the secondary replica node 202-2 to update the state of the secondary service 208 in sequential order as listed in the entries 254 of the journal 506. That is, the processor 502 may instruct the secondary replica node 202-2 to process, in sequential order, any of the requests listed in the journal 506 that the secondary replica node 202-2 has not yet processed. The sequential order of the requests may be identified by the sequence numbers assigned to the request/response pairs. In examples in which the secondary replica node 202-2 is a hot standby to the primary replica node 202-1, the secondary replica node 202-2 may not have to process any requests. However, in other examples, the secondary replica node 202-2 may process a number of requests depending upon the difference in time since a last request processing was performed.

The processor 502 may interact with the secondary replica node 202-2 as the primary replica node following the sequential state updates to the secondary service 208. That is, the processor 502 may begin forwarding client requests for the secondary service 208 to the secondary replica node 202-2. Additionally, the secondary replica node 202-2 may function as the primary replica node by also sending request/response pairs to the management device 500 as discussed above with respect to the method 400 depicted in FIG. 4. As discussed herein, there may be only one primary replica at any point in time and the primary replica may process client requests, may make changes to the client visible state, and may make changes to the journal 506. The secondary replica may only consume requests from the journal 506 and may apply the requests to their local state, which is not visible to the client. Moreover, the processor 502 may execute the instructions 526 to interact with another node 202-N as a secondary replica node by instructing the other node 202-N to change the states of a service 204 running on the another node 202-N in sequential order according to the sequential order of the requests identified in the entries 254 of the journal 506.

At block 620, the processor 502 may execute the instructions 522 to determine whether checkpointing of the entries 254 in the journal 506 is to be implemented. Checkpointing of the entries 254 generally includes ensuring that the secondary replica node 202-2 has processed the requests in the entries 254 up to a certain point and truncating the entries 254 prior to the certain point. The processor 502 may determine that checkpointing of the entries 254 is to be implemented, for instance, after a predefined period of time has elapsed since the journal 506 was created, after a predefined period of time has elapsed since a prior checkpointing operation was performed, when the size of the journal 506 exceeds a predefined threshold size, when the number of requests in the journal 506 exceeds a predefined number, or the like.

As another example, the client may send a "watermark" sequence number with each request in which a watermark of n may indicate that the client will never submit (retry) any request having a sequence number less than or equal to n. In this example, all of the requests in the journal 506 up to the request having sequence number m, in which m>n, may be checkpointed. The requests having sequence numbers beyond n may not be truncated because the client may submit a request for the response of a request r with m>r>n. If the client does not send those watermark sequence numbers, implicit assumptions, such as a contract with the client, may be made that if a request having the sequence number n is received, the client has received response n−1 and will never submit that request again.

In response to a determination that checkpointing of the entries 254 in the journal 506 is to be implemented, at block 622, the processor 502 may execute the instructions 522 to implement the checkpointing. Particularly, for instance, the processor 502 may instruct the secondary replica node 202-2 to sequentially change the state of the secondary service 208 according to the sequential order of the requests identified in the entries 254 in the journal 506 up to a certain checkpoint. The processor 502 may also determine that the secondary replica node 202-2 has changed the state of the secondary service 208 to the certain checkpoint. In addition, the processor 502 may truncate the entries 254 that are below the certain checkpoint. In other words, the processor 502 may remove the entries 254 from the journal 506 that have sequence numbers that are prior to the certain checkpoint.

Following any of blocks 618-622, the processor 502 may repeat the method 600 beginning at block 602. Additionally, the processor 502 may continue to repeat the method 600 until a determination is made that the method 600 is to end.

Some or all of the operations set forth in the methods 400 and 600 may be included as utilities, programs, or subprograms, in any desired computer accessible medium. In addition, the methods 400 and 600 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A management device comprising:
   a processor; and
   a memory on which is stored machine readable instructions that are to cause the processor to:
   receive, from a first node,
   a client request; and
   a response corresponding to the client request, wherein the first node is configured to generate the response by processing the client request on a service, and wherein a state of the service is configured to change in response to the response being generated;

generate an entry including the received client request and response;

commit the generated entry into a journal; and send an acknowledgement of the received request and response to the first node after the generated entry is committed into the journal.

2. The management device according to claim 1, wherein the instructions are further to cause the processor to send an instruction to a second node to process the client request on a secondary service provided by the second node to change a state of the secondary service.

3. The management device according to claim 2, wherein the instructions are further to cause the processor to send the instruction to the second node asynchronously with respect to sending the acknowledgement to the first node.

4. The management device according to claim 2, wherein the service provided by the first node and the secondary service provided by the second node are microservices in a microservices framework.

5. The management device according to claim 1, wherein the client request and the response are assigned a sequence number, wherein the journal includes a plurality of client request and response entries identified by respective sequence numbers, and wherein the instructions are further to cause the processor to commit the generated entry into the journal in sequential order according to the plurality of sequentially numbered client request and response entries.

6. The management device according to claim 5, wherein the first node is a primary replica node and a second node is a secondary replica node that provides a secondary service that is a backup to the service provided by the first node, and wherein the instructions are further to cause the processor to:
determine that the second node is to replace the first node as the primary replica node;
instruct the second node to change a state of the secondary service in sequential order according to the plurality of sequentially numbered client requests identified in the plurality of entries; and
interact with the second node as the primary replica node following the sequential state change of the secondary service.

7. The management device according to claim 6, wherein the instructions are further to cause the processor to instruct another node to change a state of a secondary service provided by the other node in sequential order according to the plurality of sequentially numbered client requests identified in the plurality of entries and to interact with the other node as a secondary replica node following the sequential state change of the secondary service provided by the other node.

8. The management device according to claim 5, wherein the instructions are further to cause the processor to:
instruct a second node to sequentially change a state of a secondary service according to the plurality of sequentially numbered client requests identified in the plurality of entries up to a certain checkpoint, wherein the secondary service is a backup to the service provided by the first node; and
truncate the entries including sequentially numbered client requests and responses having sequence numbers prior to the certain checkpoint.

9. A method comprising:
receiving, by a processor of a management device, a client request; and
a response corresponding to the client request, wherein the first node is configured to generate the response by processing the client request on a service, and wherein a state of the service is configured to change in response to the response being generated;
generating, by the processor, an entry including the received client request and response;
committing, by the processor, the generated entry into a journal;
after committing the generated entry into the journal,
sending, by the processor, an acknowledgement to the first node; and
sending, by the processor, an instruction to a second node to change a state of a secondary service running on the second node according to the client request in the generated entry, wherein the secondary service is a backup to the service.

10. The method according to claim 9, wherein sending the instruction to the second node further comprises sending the client request included in the generated entry to the second node.

11. The method according to claim 9, wherein sending the instruction to the second node further comprises sending the instruction to the second node asynchronously with respect to sending the acknowledgement to the first node.

12. The method according to claim 9, wherein the client request and the response are assigned a sequence number, wherein the journal includes a plurality of client request and response entries identified by respective sequence numbers, and wherein committing the generated entry into the journal further comprises committing the generated entry in sequential order according to the plurality of sequentially numbered request and response entries.

13. The method according to claim 12, wherein the first node is a primary replica node and the second node is a secondary replica node and wherein the service running on the second node is a backup to the service provided by the first node, the method further comprising:
determining that the second node is to replace the first node as the primary replica node;
instructing the second node to change a state of the secondary service in sequential order according to the plurality of sequentially numbered client requests identified in the plurality of entries; and
interacting with the second node as the primary replica node following the sequential state change of the secondary service.

14. The method according to claim 13, further comprising:
instructing another node to change a state of a secondary service provided by the other node in sequential order according to the plurality of sequentially numbered requests, wherein the secondary service provided by the other node is a backup to the secondary service provided by the primary replica node; and
interacting with the other node as a secondary replica node following the sequential state change of the secondary service provided by the other node.

15. The method according to claim 12, further comprising:
instructing the second node to sequentially change the state of the secondary service according to the plurality of sequentially numbered requests identified in the plurality of entries up to a certain checkpoint;
determining that the second node has changed the state of the secondary service to the certain checkpoint; and truncating the entries including sequentially numbered client requests and responses having sequence numbers prior to the certain checkpoint.

16. A non-transitory computer readable medium on which is stored machine readable instructions that when executed by a processor of a node are to cause the processor to:
   receive a client request to change a state of a service provided by the node;
   determine whether the client request and a corresponding response to the client request are recorded on a journal; and
   in response to a determination that the client request and the corresponding response are not recorded on the journal,
   process the client request according to the received request;
   generate a response corresponding to the processed client request, wherein the processed client request changes the state of the service;
   send the received client request and the generated response to a management device; and
   in response to receipt of an acknowledgement from the management device that an entry comprising the client request and the generated response are committed into the journal, output the generated response.

17. The non-transitory computer readable medium according to claim 16, wherein the client request is assigned a sequence number and wherein the instructions are further to cause the processor to send the sequence number assigned to the client request to the management device for entry of the sequence number in the journal.

18. The non-transitory computer readable medium according to claim 17, wherein the instructions are further to cause the processor to:
   determine whether the sequence number assigned to the client request is a next number in a sequence of numbers corresponding to received client requests; and
   in response to a determination that the sequence number of the client request is not a next number in the sequence of numbers, wait to process the client request until the sequence number assigned to the request is reached.

19. The non-transitory computer readable medium according to claim 16, wherein the instructions are further to cause the processor to:
   in response to a determination that the client request and the corresponding response are recorded on the journal, return the corresponding response from the journal to a client that submitted the client request.

20. The non-transitory computer readable medium according to claim 16, wherein the instructions are further to cause the processor to:
   receive another request pertaining to the service from a client;
   determine whether the other request is a state-changing request; and
   in response to a determination that the other request is not a state-changing request,
   process the request on the service;
   generate a corresponding response to the other request; and
   send the corresponding response to the client without sending the other request and the corresponding response to the management device.

\* \* \* \* \*